US009827671B2

United States Patent
Kitayama et al.

(10) Patent No.: US 9,827,671 B2
(45) Date of Patent: Nov. 28, 2017

(54) TEACHING OPERATION SUPPORTING APPARATUS FOR ROBOT MOTION, AND TEACHING OPERATION SUPPORTING METHOD

(71) Applicant: FANUC CORPORATION, Yamanashi (JP)

(72) Inventors: Ayumu Kitayama, Yamanashi (JP); Takashi Itsukaichi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/210,930

(22) Filed: Jul. 15, 2016

(65) Prior Publication Data
US 2017/0014996 A1    Jan. 19, 2017

(30) Foreign Application Priority Data
Jul. 17, 2015    (JP) .................................. 2015-143246

(51) Int. Cl.
*B25J 9/16*    (2006.01)

(52) U.S. Cl.
CPC .............. *B25J 9/163* (2013.01); *B25J 9/1687* (2013.01); *Y10S 901/03* (2013.01)

(58) Field of Classification Search
CPC ...... G05B 19/425; G05B 19/42; B25J 9/1664; B25J 9/0093; Y02P 90/083
See application file for complete search history.

(56) References Cited

U.S. PATENT DOCUMENTS

| 5,030,083 | A | * | 7/1991 | Kohno ..................... B25J 9/046 264/540 |
| 5,288,224 | A | * | 2/1994 | Yamamura .......... B29C 49/4242 264/150 |
| 5,724,489 | A | | 3/1998 | Yamamoto et al. |
| 6,445,964 | B1 | | 9/2002 | White et al. |
| 6,822,412 | B1 | | 11/2004 | Gan et al. |
| 7,324,873 | B2 | | 1/2008 | Nagatsuka et al. |

(Continued)

FOREIGN PATENT DOCUMENTS

| CN | 104552300 A | 4/2015 |
| JP | S51137267 A | 11/1976 |

(Continued)

*Primary Examiner* — Ryan Rink
(74) *Attorney, Agent, or Firm* — Hauptman Ham, LLP

(57) ABSTRACT

A teaching operation supporting apparatus includes a teaching jig which makes, when a mold is stationary, tentative teaching points by touching up a groove more than once while moving along the groove and which is attached to a robot, a coordinate value calculating unit for calculating coordinate values of actual robot teaching points corresponding to the respective tentative teaching points, based on the distance between a grasping position and the bottom end of the string-like workpiece, and coordinate values of the tentative teaching points, and a speed calculating unit for calculating a lowering speed of the robot for each of portions between adjacent ones of the robot teaching points, based on distances between adjacent ones of the robot teaching points, horizontal distances between adjacent ones of the tentative teaching points corresponding to the respective robot teaching points, and the constant speed of the mold.

2 Claims, 4 Drawing Sheets

(56) References Cited

U.S. PATENT DOCUMENTS

| | | | |
|---|---|---|---|
| 2005/0084562 A1* | 4/2005 | Elgner | B29C 49/4242 425/532 |
| 2007/0073444 A1 | 3/2007 | Kobayashi et al. | |
| 2009/0025199 A1* | 1/2009 | Hariki | B25J 9/1682 29/430 |
| 2009/0065971 A1* | 3/2009 | De Rijcke | B29C 47/0035 264/209.8 |
| 2013/0184871 A1* | 7/2013 | Fudaba | B25J 13/02 700/264 |
| 2013/0240328 A1* | 9/2013 | Nukui | B65G 17/485 198/604 |
| 2014/0379132 A1* | 12/2014 | Fudaba | B25J 9/1689 700/260 |
| 2015/0073596 A1* | 3/2015 | Fudaba | B25J 3/04 700/259 |

FOREIGN PATENT DOCUMENTS

| | | | |
|---|---|---|---|
| JP | H0976065 A | 3/1997 | |
| JP | H1083207 A | 3/1998 | |
| JP | 2007504290 A | 3/2007 | |

\* cited by examiner

US 9,827,671 B2

TEACHING OPERATION SUPPORTING APPARATUS FOR ROBOT MOTION, AND TEACHING OPERATION SUPPORTING METHOD

RELATED APPLICATIONS

The application claims priority to Japanese Patent Application Number 2015-143246, filed Jul. 17, 2015, the disclosure of which is hereby incorporated by reference in its entirety.

BACKGROUND OF THE INVENTION

1. Field of the Invention

The present invention relates to a teaching operation supporting apparatus for supporting a teaching operation for robot motion for disposing a string-like workpiece in a groove of a mold moving horizontally, and a teaching operation supporting method.

2. Description of the Related Art

In the system disclosed in Japanese Unexamined Patent Publication (Kokai) No. 10-83207, a teaching operation for robot motion is performed when an object is stationary, and thereafter, the object is moved by a conveyor. Further, an encoder measures a rotation angle of a motor for driving the conveyor, to obtain the amount of movement of the object, and then, a teaching point for a robot is shifted in synchronization with the amount of movement.

SUMMARY OF THE INVENTION

However, in Japanese Unexamined Patent Publication (Kokai) No. 10-83207, an encoder and other additional devices are necessary, and thus, the cost of the entirety of the system increases.

The present invention is made in view of these problems. It is an object of the present invention to provide a teaching operation supporting apparatus which can support a teaching operation at low cost, and a teaching operation supporting method.

In order to accomplish the above object, according to a first aspect of the invention, in an operation for lowering a robot grasping a string-like workpiece being hanging down, to dispose the string-like workpiece in a groove formed in the top face of a mold being conveyed horizontally, by a conveyance unit, at a constant speed, a teaching operation supporting apparatus for supporting a teaching operation for the motion of the robot is provided. The teaching operation supporting apparatus includes a teaching jig which makes, when the mold is stationary, a plurality of tentative teaching points by touching up the groove more than once while moving along the groove and which is attached to the robot, a coordinate value calculating unit for calculating coordinate values of a plurality of actual robot teaching points corresponding to the respective tentative teaching points, based on the distance between a grasping position, at which the robot grasps the string-like workpiece being hanging down, and the bottom end of the string-like workpiece, and coordinate values of the tentative teaching points, and a speed calculating unit for calculating a lowering speed of the robot for each of portions between adjacent ones of the robot teaching points, based on distances between adjacent ones of the robot teaching points, horizontal distances between adjacent ones of the tentative teaching points corresponding to the respective robot teaching points, and the constant speed of the mold.

According to a second aspect of the invention, in the first aspect of the invention, the string-like workpiece tends to cure as time passes.

According to a third aspect of the invention, in an operation for lowering a robot grasping a string-like workpiece being hanging down, to dispose the string-like workpiece in a groove formed in the top face of a mold being conveyed horizontally, by a conveyance unit, at a constant speed, a teaching operation supporting method for supporting a teaching operation for the motion of the robot is provided. The method includes the step of making a plurality of tentative teaching points by touching up the groove more than once, using a teaching jig moving along the groove and being attached to the robot, when the mold is stationary, the step of calculating coordinate values of a plurality of actual robot teaching points corresponding to the respective tentative teaching points, based on the distance between a grasping position at which the robot grasps the string-like workpiece being hanging down and the bottom end of the string-like workpiece, and coordinate values of the tentative teaching points, and the step of calculating a lowering speed of the robot for each of portions between adjacent ones of the robot teaching points, based on distances between adjacent ones of the robot teaching points, horizontal distances between adjacent ones of the tentative teaching points corresponding to the respective robot teaching points, and the constant speed of the mold.

According to a fourth aspect of the invention, in the third aspect of the invention, the string-like workpiece tends to cure as time passes.

These and other objects, features and advantages of the present invention will become more apparent in light of the detailed description of exemplary embodiments thereof as illustrated by the drawings.

DETAILED DESCRIPTION

Figure 1:
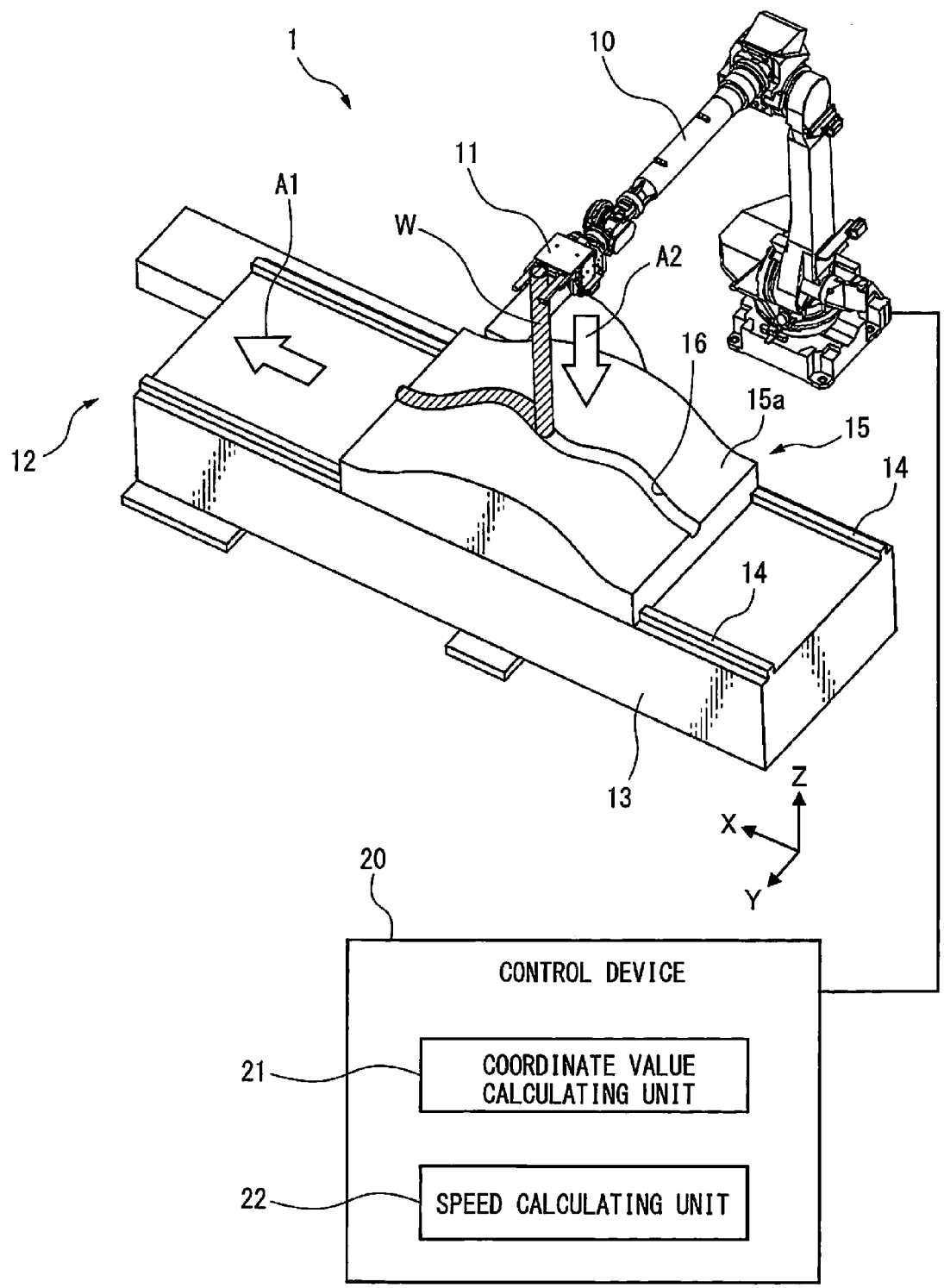
FIG. 1 is a schematic view of a teaching operation supporting apparatus according to the present invention.

Embodiments of the present invention will be described below with reference to the accompanying drawings. In the following drawings, similar components are designated with the same reference numerals. To facilitate understanding of the present invention, the reduction scales of the drawings are suitably changed.

FIG. 1 is a schematic view of a teaching operation supporting apparatus according to the present invention. As shown in FIG. 1, a teaching operation supporting apparatus 1 includes a robot 10, a conveyance unit 12, and a control device 20 for controlling the robot 10 and the conveyance unit 12.

The robot 10 is, for example, an articulated robot. An openable and closable hand 11 is provided at a tip end of an arm of the robot 10. In FIG. 1, the hand 11 grasps an end of a string-like workpiece W, and the residual portion of the string-like workpiece W hangs down from the hand 11. The string-like workpiece W is a flexible long member, for example, a resin pipe. Further, the string-like workpiece W tends to cure as time passes. Further, in FIG. 1, it is preferable that the robot 10 is disposed on one side of the conveyance unit 12.

The conveyance unit 12 includes a base 13 disposed horizontally, two guide parts 14 which are parallel to each other and which longitudinally extend on the top face of the base 13, and a mold 15 which slides along the guide parts 14. The mold 15 is controlled so as to slide along the guide parts 14 in the direction of an arrow A1, at a constant speed B. Note that, in FIG. 1, the direction in which the mold 15 slides is the +X direction, a direction perpendicular to the direction of slide is the Y direction, and the upward direction is the +Z direction.

As shown in FIG. 1, the mold 15 has a top face 15a which is, for example, curved so as to project upward. The mold 15 may have a curved top face 15a having some other shape. A workpiece set path, to which the string-like workpiece W is set, for example, a groove 16 is formed in the top face 15a. In FIG. 1, the groove 16 is winding and extends, in substantially parallel with the guide parts 14, from one end to the other end of the mold 15. Note that, since the top face 15a of the mold 15 is curved as described above, the groove 16 is not defined in the X-Y plane, and is defined in the X-Y-Z space.

Figure 2:
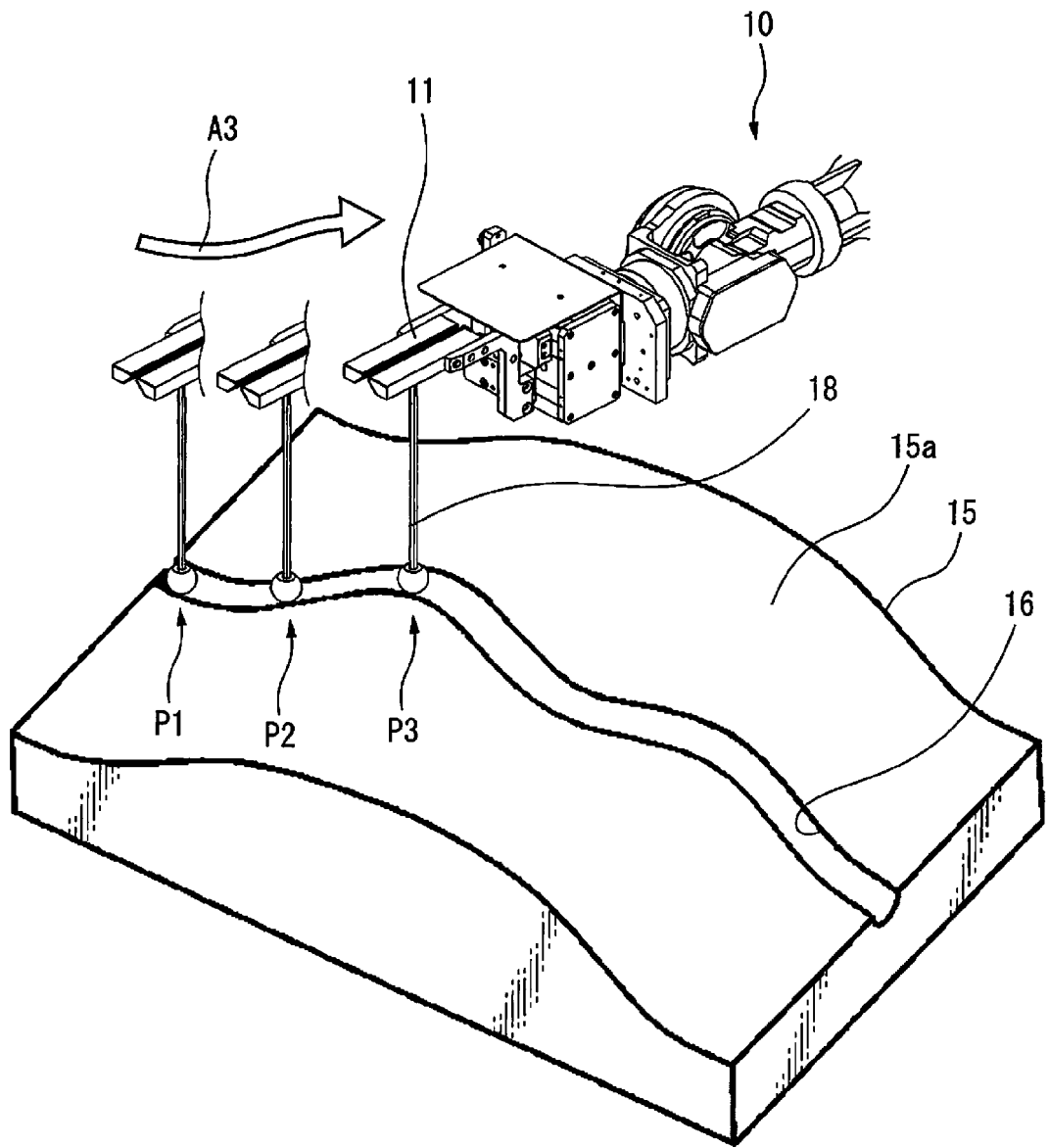
FIG. 2 is an enlarged perspective view of a robot and a mold.

FIG. 2 is an enlarged perspective view of a robot and a mold. The mold 15 is secured to the guide parts 14, which is not shown in FIG. 2, so as not to slide. Further, in FIG. 2, the hand 11 of the robot 10 grasps a teaching jig 18 in place of the string-like workpiece W. As illustrated, the teaching jig 18 is grasped, by the hand 11, so that its tip end hangs down in the vertical direction. As will be described later, the teaching jig 18 is used to make a plurality of tentative teaching points by touching up the groove 16 more than once while moving along the groove 16. The teaching jig 18 is hard enough not to be deformed during the touching up.

Referring again to FIG. 1, the control device 20 is a digital computer, and includes a coordinate value calculating unit 21 for calculating coordinate values of a plurality of actual robot teaching points corresponding to the respective tentative teaching points, based on a distance between a grasping position, at which the robot 10 grasps the string-like workpiece W being hanging down, and the bottom end of the string-like workpiece W, and coordinate values of the tentative teaching points.

The control device 20 also includes a speed calculating unit 22 for calculating a lowering speed of the robot 10 for each of portions between adjacent ones of the robot teaching points, based on distances between adjacent ones of the robot teaching points, horizontal distances between adjacent ones of the tentative teaching points corresponding to the respective robot teaching points, and a constant speed of the mold.

Figure 3:
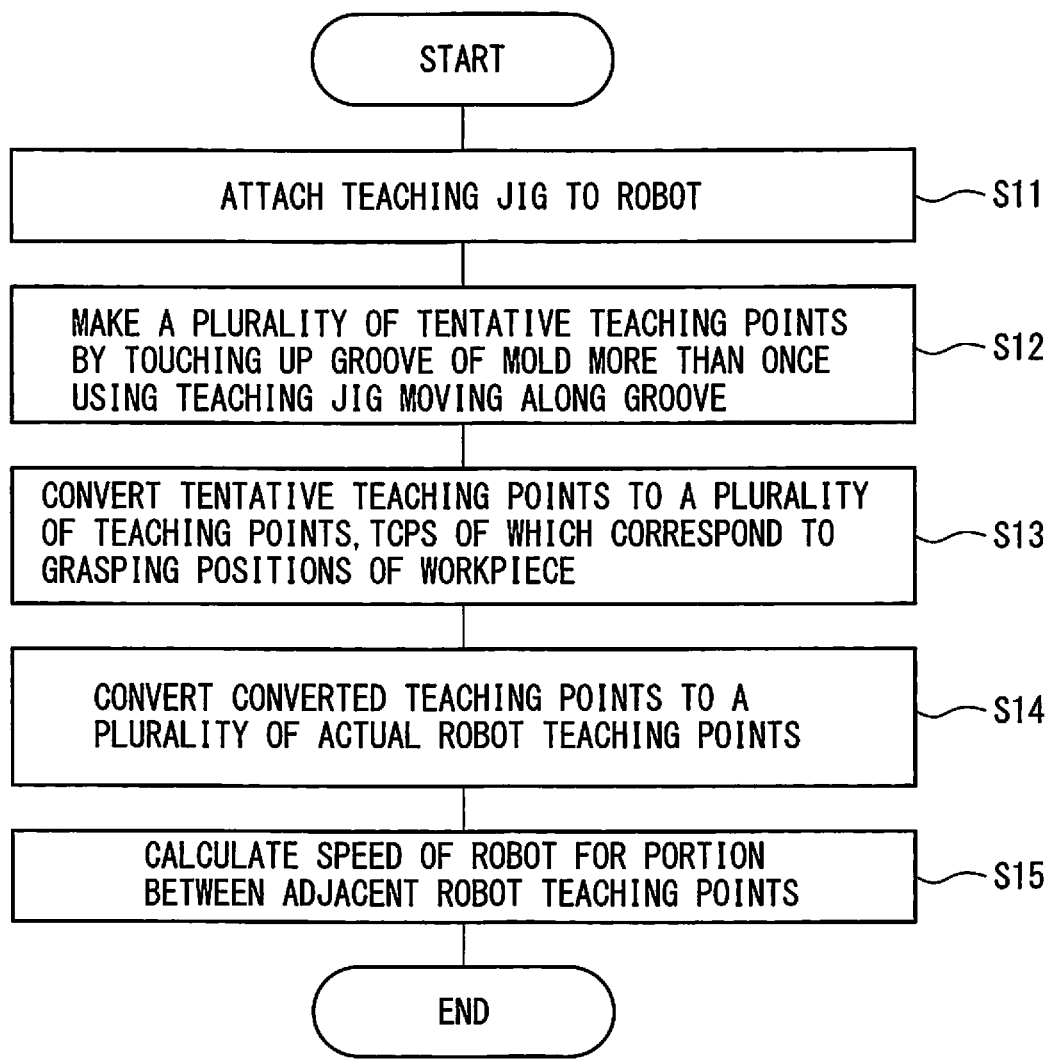
FIG. 3 is a flowchart showing the operation of the teaching operation supporting apparatus shown in FIG. 1.

FIG. 3 is a flowchart of the motion of the teaching operation supporting apparatus shown in FIG. 1. The motion of the teaching operation supporting apparatus will be described below with reference to FIGS. 1 to 3. Note that the teaching operation supporting apparatus 1 according to the present invention supports teaching operations for the motion of the robot 10 in an operation for lowering, in the direction of an arrow A2, the robot 10 grasping the string-like workpiece W being hanging down, to dispose the string-like workpiece W in the groove 16 formed in the top face of the mold 15 conveyed by the conveyance unit 12 in the direction of the arrow A1, at a constant speed.

First, in step S11, as described with reference to FIG. 2, the teaching jig 18 is grasped by the hand 11 of the robot 10. Further, in step S12, the teaching jig 18 is used to make a plurality of tentative teaching points by touching up the groove 16 of the mold 15 more than once while moving along the groove 16. Note that the tool center point (TCP) of the teaching jig 18 is preliminarily set.

In an example shown in FIG. 2, the tip end of the teaching jig 18 touches up an end of the groove 16 at position P1, and then, the hand 11 moves in the direction of an arrow A3, and performs another touch-up operation at position P2 in the groove 16. Subsequently, the hand 11 further moves in the direction of the arrow A3, and performs still another touch-up operation at a position P3 in the groove 16. The positions P1 to P3, at which the touch-up operations are performed, correspond to tentative teaching points P1 to P3.

In actual fact, touch-up operations are successively performs from one end of the groove 16 (corresponding to position P1) to the other end (corresponding to position Pn, wherein "n" is a natural number). However, in order to avoid duplication, positions subsequent to position P3 are not illustrated or described. Further, it is indisputable that, as the number of touch-up operations increases, the accuracy of teaching operations increases.

Figure 4:
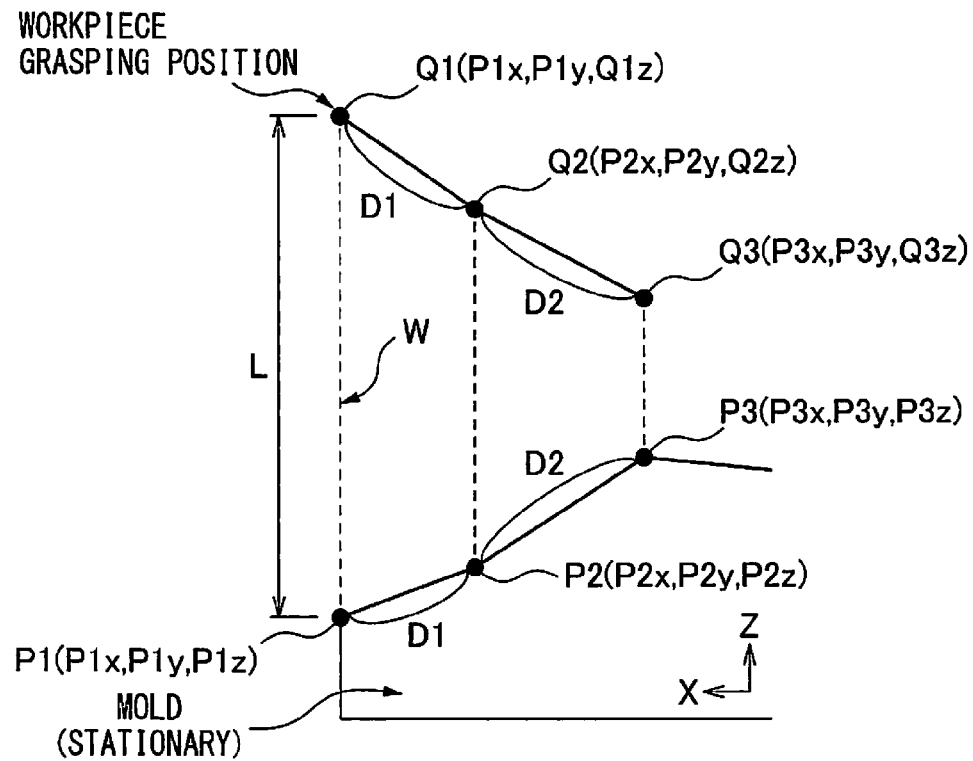
FIG. 4 is a first view of a teaching method.

Subsequently, in step S13, the coordinate value calculating unit 21 converts the tentative teaching points P1 to Pn to teaching points Q1 to Qn, the TCPs of which correspond to grasping positions of the string-like workpiece W. In this respect, FIG. 4 is a first view of a teaching method, and shows the X-Z plane. In FIG. 4, the mold 15 is stationary, and does not move horizontally. In FIG. 4, the three dimensional positions of the tentative teaching points P1 to P3 are respectively defined as P1 (P1$x$, P1$y$, P1$z$), P2 (P2$x$, P2$y$, P2$z$), P3 (P3$x$, P3$y$, P3$z$). Further, FIG. 4 shows a distance D1 between the tentative teaching points P1 and P2. The distance D1 can be easily calculated from the coordinate values of the tentative teaching points P1 and P2.

FIG. 4 also shows a grasping position Q1 at which the hand 11 grasps the string-like workpiece W. However, when the teaching operation supporting apparatus 1 is moved in accordance with the flowchart shown in FIG. 3, the string-like workpiece W is not necessary to be attached to the hand 11 of the robot 10. The grasping position Q1 is positioned directly above, in the vertical direction, the tentative teaching point P1 corresponding to an end of the groove 16. Further, a distance L between the grasping position Q1 and the tentative teaching point P1 corresponds to a distance between the grasping position Q1 and the bottom end of the string-like workpiece W. This distance substantially corresponds to the length of the string-like workpiece W. Thus, the bottom end of the string-like workpiece W corresponds to a starting point at which the workpiece is set. Thus, the teaching point Q1, the TCP of which corresponds to the grasping position Q1, is expressed by Q1 (P1$x$, P1$y$, Q1$z$ (=P1$z$+L)).

The teaching point Q2 is positioned directly above, in the vertical direction, the tentative teaching point P2. Further, the distance between the teaching point Q1 and the teaching point Q2 corresponds to the distance D1 between the tentative teaching point P1 and the tentative teaching point P2. Thus, the teaching point Q2 is expressed by Q2 (P2$x$, P2$y$, Q2$z$(=P2$z$+L−D1)).

The teaching point Q3 is positioned directly above, in the vertical direction, the tentative teaching point P3. Further, the distance between the teaching point Q2 and the teaching point Q3 corresponds to a distance D2 between the tentative teaching point P2 and the tentative teaching point P3. Accordingly, the teaching point Q3 is expressed by Q3 (P3$x$, P3$y$, Q3$z$(=P2$z$+L−D1−D2)). Thus, a plurality of teaching points Qn, in which their TCPs correspond to grasping positions of the string-like workpiece W, are expressed by Qn (Pnx, Pny, Qnz), and Qnz is expressed by Equation (1) below (wherein, "k" is a natural number).

$$Qnz = Pnz + L - \sum_{k=1}^{n-1} Dk \qquad (1)$$

Figure 5:
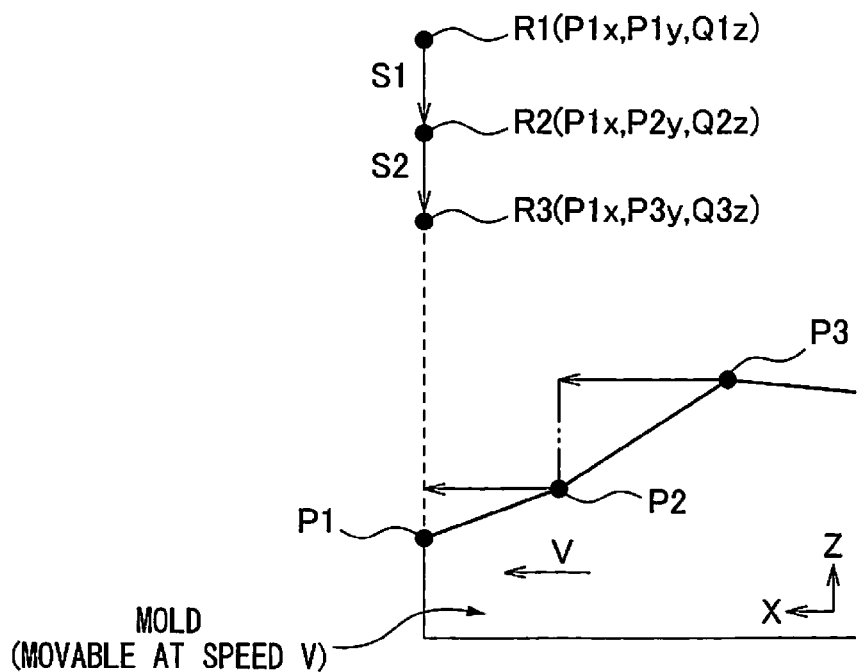
FIG. 5 is a second view of a teaching method.

In FIG. 4, the teaching points Q1 to Qn are shifted in the −X direction. However, in actual fact, the mold 15 slides, at a constant speed V, in the +X direction, and the robot 10 is controlled so as not to move in the X direction. Thus, in step S14 of FIG. 3, the coordinate value calculating unit 21 further converts the converted teaching points Q1 to Qn to actual robot teaching points R1 to Rn. In this respect, FIG. 5 is a second view of a teaching method, and shows the X-Z plane. In FIG. 5, the mold 15 moves in the direction of the arrow A1 shown in FIG. 1, at the constant speed V.

As is clear from FIG. 5, the coordinate value calculating unit 21 defines the actual robot teaching points R1 to Rn as follows.
R1 (P1x, P1y, Q1z)
R2 (P1x, P2y, Q2z)
Rn (Pnx, Pny, Qnz)
Note that Qnz is defined by Equation (1) above.

The mold 15 is moved by the conveyance unit 12 at the constant speed V, and the groove 16 formed in the mold 15 is winding as is clear from FIG. 1. Thus, when the string-like workpiece W grasped by the hand 11 is lowered at a constant speed, the string-like workpiece W cannot be appropriately disposed in the groove 16 being winding.

Thus, in step S15 of FIG. 3, the speed calculating unit 22 calculates a lowering speed, at which the robot 10 is lowered, for each of portions between adjacent ones of the robot teaching points R1 to Rn. As described above, the conveyance unit 12 conveys the mold 15 at the constant speed V. Thus, a lowering speed S1 of the robot for the portion between the first robot teaching point R1 and the second robot teaching point R2 is calculated from the ratio between the distance in the Y-Z plane between the teaching points Q1 and Q2 respectively corresponding to the robot teaching points R1 and R2 and the distance in the X direction therebetween. Specifically, the lowering speed S1 of the robot for the portion between the first robot teaching point R1 and the second robot teaching point R2 is calculated by Equation (2) below.

$$S1 = \left| \frac{\sqrt{(Q2z - Q1z)^2 + (P2y - P1y)^2}}{P2x - P1x} \right| V \qquad (2)$$

When this calculation is generalized, a lowering speed Sn for the portion between the n-th robot teaching point Rn and the (n+1)-th robot teaching point R(n+1) is calculated by Equation (3) below.

$$Sn = \left| \frac{\sqrt{(Q(n+1)z - Qnz)^2 + (P(n+1)y - Pny)^2}}{P(n+1)x - Pnx} \right| V \qquad (3)$$

Thus, in the present invention, the actual robot teaching points R1 to Rn and the lowering speeds S1 to Sn can be obtained based on the tentative teaching points P1 to Pn which are made when the mold 15 is stationary. Accordingly, in the present invention, when robot teaching points R1 to Rn, etc., are obtained, it is not necessary to use a line-tracking function or to add an encoder to a motor for driving the conveyance unit 12. Thus, the present invention enables the obtainment of the robot teaching points R1 to Rn, etc., at low cost, and the support for teaching operations for the robot 10.

Further, in the present invention, although the groove 16 of the mold 15 is winding, each of lowering speeds S1 etc., is obtained for the corresponding portion between two adjacent ones of the robot teaching points. Thus, in the present invention, the robot 10 is lowered while being moved in the Y direction in accordance with the robot teaching points R1, etc., and the lowering speeds S1 etc., and thus, the string-like workpiece W can be appropriately disposed in the groove 16 being winding.

Further, when the tentative teaching points P1 to Pn are obtained using the string-like workpiece W which tends to cure as time passes, the string-like workpiece W may cure before or while the tentative teaching points P1 to Pn are obtained. In the present invention, the tentative teaching points P1 to Pn are obtained using the teaching jig 18, and accordingly, such a failure can be avoided.

Effect of the Invention

In first and third aspects of the invention, teaching points for a robot are obtained based on a plurality of tentative teaching points which are made when a mold is stationary, and accordingly, the support for teaching operations can be performed at low cost without using a line-tracking function or adding, for example, an encoder.

When tentative teaching points are obtained using a string-like workpiece which tends to cure as time passes, the string-like workpiece may cure before or while the tentative teaching points are obtained. In the first and third aspects of the invention, the tentative teaching points are obtained using a teaching jig. Accordingly, even when the string-like workpiece which tends to cure as time passes is disposed in a groove of a mold as in second and fourth aspects of the invention, such a failure can be avoided.

The present invention has been described above using exemplary embodiments. However, a person skilled in the art would understand that the aforementioned modifications and various other modifications, omissions, and additions can be made without departing from the scope of the present invention.

The invention claimed is:
1. A teaching operation supporting apparatus for supporting a teaching operation for a motion of a robot in an operation in which the robot grasps and lowers a string-shaped workpiece hanging down from the robot, to dispose the string-shaped workpiece in a groove formed in a top face of a mold being conveyed horizontally at a constant speed by a conveyance unit, the teaching operation supporting apparatus comprising:
a teaching jig configured to mark a plurality of tentative teaching points by touching the groove more than once while being attached to the robot and moving along the groove, when the mold is stationary;
a coordinate value calculating unit configured to calculate coordinate values of a plurality of actual robot teaching points corresponding to the plurality of tentative teaching points, based on a distance between (i) a grasping position at which the robot grasps the string-shaped workpiece hanging down and (ii) the bottom end of the string-shaped workpiece, and coordinate values of the plurality of tentative teaching points; and a speed calculating unit configured to calculate a lowering speed of the robot for each of portions of a travel path of the mold between adjacent actual robot teaching points among the plurality of actual robot teaching points, based on distances between the adjacent actual robot teaching points, horizontal distances between adjacent tentative teaching points among the plurality of tentative teaching points corresponding to the adjacent actual robot teaching points, and the constant speed of the mold.

2. A teaching operation supporting method for supporting a teaching operation for a motion of a robot in an operation in which the robot grasps and lowers a string-shaped workpiece being hanging down from the robot, to dispose the string-shaped workpiece in a groove formed in a top face of a mold being conveyed horizontally at a constant speed by a conveyance unit, the teaching operation supporting method comprising:

marking a plurality of tentative teaching points by touching the groove more than once with a teaching jig, while the teaching jig being attached to the robot and moving along the groove, when the mold is stationary;

calculating coordinate values of a plurality of actual robot teaching points corresponding to the plurality of tentative teaching points, based on a distance between (i) a grasping position at which the robot grasps the string-shaped workpiece hanging down and (ii) the bottom end of the string-shaped workpiece, and coordinate values of the plurality of tentative teaching points; and calculating a lowering speed of the robot for each of portions of a travel path of the mold between adjacent actual robot teaching points among the plurality of actual robot teaching points, based on distances between the adjacent actual robot teaching points, horizontal distances between adjacent tentative teaching points among the plurality of tentative teaching points corresponding to the adjacent actual robot teaching points, and the constant speed of the mold.

\* \* \* \* \*